(12) United States Patent
Schwender et al.

(10) Patent No.: US 11,305,216 B2
(45) Date of Patent: Apr. 19, 2022

(54) FILTER DEVICE

(71) Applicant: HYDAC FILTERTECHNIK GMBH, Sulzbach/Saar (DE)

(72) Inventors: Matthias Schwender, Kirkel (DE); Edwin Koch, Tholey (DE); Daniel Kleemann, Alsting (FR); Ute Lehmann, Spiesen/ Elversberg (DE); Alexander Nenno, Marpingen (DE); Andre Michael Schneider, Mandelbachtal (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 18 days.

(21) Appl. No.: 16/647,586

(22) PCT Filed: Sep. 6, 2018

(86) PCT No.: PCT/EP2018/073997
§ 371 (c)(1),
(2) Date: Mar. 16, 2020

(87) PCT Pub. No.: WO2019/057505
PCT Pub. Date: Mar. 28, 2019

(65) Prior Publication Data
US 2020/0206657 A1 Jul. 2, 2020

(30) Foreign Application Priority Data
Sep. 20, 2017 (DE) .................... 10 2017 008 812.8

(51) Int. Cl.
*B01D 29/21* (2006.01)
*B01D 29/54* (2006.01)
(Continued)

(52) U.S. Cl.
CPC ............. *B01D 29/21* (2013.01); *B01D 29/54* (2013.01); *B01D 29/58* (2013.01); *B01D 35/147* (2013.01);
(Continued)

(58) Field of Classification Search
CPC ........ B01D 29/21; B01D 29/54; B01D 29/58; B01D 35/147; B01D 2201/188;
(Continued)

(56) References Cited

U.S. PATENT DOCUMENTS 3,056,501 A * 10/1962 Thorman ............. B01D 35/147
210/132
6,077,391 A  6/2000 Girondi
(Continued)

FOREIGN PATENT DOCUMENTS

DE  10 2004 061 078   6/2006
DE  10 2008 014 416   10/2009
(Continued)

OTHER PUBLICATIONS

International Search Report (ISR) dated Nov. 20, 2018 in International (PCT) Application No. PCT/EP2018/073997.

*Primary Examiner* — Waqaas Ali
(74) *Attorney, Agent, or Firm* — Wenderoth, Lind & Ponack, L.L.P.

(57) ABSTRACT

A filter device for transmission oil has a filter element (24) insertable into a transmission oil pan (70) with a filter medium (32) separating an unfiltered side from a filtrate chamber connected to an outlet (38, 50, 72), to which a suction oil pump can be connected. The filter medium (32) has a first structural layer (46) having a predetermined surface area and predeterminable filter properties and has a second structural layer (44, 60) having predeterminable filter properties. The surface area of the second structural layer
(Continued)

(44; 60) is different from the surface area of the first structural layer (46). The structural layers (44, 46, 60) encompass an inner filter cavity (30) and are pleated having the same type of pleats. The pleated structural layers (44, 46, 60) extend in axial alignment between two end caps (22, 34) of the filter element (24). Viewed in the flow direction of the fluid flow to be cleaned, the structural layers (44, 60) having the higher filtration grade are downstream of an upstream structural layer (46) having a lower filtration grade.

13 Claims, 11 Drawing Sheets (51) Int. Cl.
  *B01D 29/58* (2006.01)
  *B01D 35/147* (2006.01)

(52) U.S. Cl.
  CPC .. *B01D 2201/188* (2013.01); *B01D 2201/295* (2013.01); *B01D 2201/34* (2013.01)

(58) Field of Classification Search
  CPC .......... B01D 2201/295; B01D 2201/34; B01D 2201/12; B01D 2201/602; B01D 2201/4053; B01D 2201/605; B01D 35/0273
  See application file for complete search history.

(56) References Cited

U.S. PATENT DOCUMENTS

| | | |
|---|---|---|
| 6,283,307 B1 | 9/2001 | Girondi |
| 2010/0044301 A1 | 2/2010 | Stausberg |
| 2013/0146526 A1 | 6/2013 | Saito et al. |
| 2016/0003115 A1 | 1/2016 | van Uffelen |
| 2016/0121243 A1 | 5/2016 | Altwies et al. |
| 2016/0228800 A1* | 8/2016 | Walk .................. B01D 46/2403 |

FOREIGN PATENT DOCUMENTS

| | | |
|---|---|---|
| DE | 10 2007 023 641 | 4/2015 |
| DE | 10 2014 009 707 | 1/2016 |
| DE | 10 2015 017 019 | 7/2017 |
| EP | 0 793 990 | 9/1997 |
| EP | 2 156 874 | 2/2010 |

\* cited by examiner

FILTER DEVICE

BACKGROUND OF THE INVENTION

The invention relates to a filter device for transmission oil, having a filter element, which can be inserted into a transmission oil pan. The filter medium of the filter element separates an unfiltered side from a filtrate chamber, which is connected to an outlet in a fluid-conveying manner. A negative pressure conveying device, such as an oil suction pump, can be connected to the outlet. The filter medium of the filter element has a first structural layer having a predetermined surface area and having predetermined filter properties and has a second structural layer having predetermined filter properties. The surface area of the second structural layer differs from the surface area of the first structural layer. The individual structural layers comprise an internal filter cavity.

BACKGROUND OF THE INVENTION

To ensure the safe and trouble-free operation of transmissions over long operating periods, the state of the art provides a filter device for the transmission oil. DE 10 2007 023 641 B4 discloses a filter device of the aforementioned type, which operates as a suction filter. The design as a suction filter is characterized by significantly smaller installation space requirements compared to a pressure oil filter device. Unlike pressure oil filter devices, which normally operate in a bypass flow and are mounted inside the transmission housing or on the outside of the transmission housing, suction filters can be installed without difficulty directly in the oil sump of the oil pan of the individual transmission. For optimum maintenance of the transmission oil, it is advantageous to provide filter media having different filter properties for the filtering process, through which the unfiltered medium can flow. The well-known filter device mentioned above provides for two filter media in the form of a coarse filter medium and a fine filter medium, each formed by a flat filter, which are arranged one above the other inside the oil pan.

SUMMARY OF THE INVENTION

Based on this state of the art, the invention addresses the problem of providing a filter device of the type mentioned at the outset, which permits filtering a flow passing filter media having different filter properties and which is characterized by a particularly space-saving design.

According to the invention, this object is basically achieved by a filter device that has the individual structural layers pleated having the same type of pleats. The pleated structural layers extend axially aligned between two end caps of the filter element. Viewed in the direction of flow of the fluid flow to be cleaned, a structural layer having a higher filtration grade is downstream of a preceding structural having a lower filtration grade. By combining structural layers having different filter properties into a single filter medium, instead of the separate, superimposed filter media provided by the state of the art mentioned above, a compact design can be achieved that requires little installation space and is therefore particularly suitable for installation in the oil pan of a transmission housing. Because, further according to the invention, the individual structural layers also have different surface areas. By partial flows of the suction flow flow through the structural layers having different properties, a simple parallel arrangement of the differently filtered parts of the suction flow is achieved.

For this purpose, the filter medium is designed such as described in DE 10 2004 061 078 A1 for a filter component, in which a first structural layer is designed in the manner of a prefilter and a second structural layer is designed in the manner of a main filter. As explained in this document, the prefilter layer extends as a first structural layer having a predeterminable surface area and having a predeterminable length in the form of a longitudinal strip. The second structural layer in the form of a main filter has a predeterminable length, which is smaller than the length of the prefilter and is arranged on the top of the structural layer.

In accordance with the known filter component mentioned above, the filter medium has structural layers having different filtration grades.

The structural layers can be pleated in the manner typical for filter mats, preferably having the same type and number of pleats. The structural layers can be single-layer or multi-layered.

The pleated structural layers are arranged as a filter mat between end caps and encompass an inner filter cavity. In this way an easily usable and, if necessary, exchangeable unit is created, which constitutes a standardized filter element constituting a cost-effective solution for the transmission oil system.

If the fluid flows through filter mat of the filter element from the inside to the outside, the inner filter cavity as the unfiltered side is connected to the oil sump of the assigned oil pan in a fluid conveying manner. The filter mat can have a supporting structure on the outside encompassing the outer structural layers. If the fluid flows through the filter mat of the filter element from the outside to the inside, the inner filter cavity forms the filtrate side, and the filter mat may have an inner supporting structure in contact with the inner structural layer.

In particularly advantageous exemplary embodiments, a filter element in the form of a flat filter is provided. Its filter mat, which encompasses the filter cavity, has a flat cross-sectional shape having large-area planar long sides and narrow, rounded short sides in relation to a section plane extending in parallel to the end caps. One long side of the filter element faces the bottom of the assigned transmission oil pan. Such exemplary embodiments are characterized by a particularly low overall height, and thus, require little installation space.

The arrangement can advantageously be such that the filter element in the oil pan is accommodated in an inner housing, which has an inlet, routed to the inner filter cavity.

The filtrate chamber encompasses the filter element and a fluid outlet routed to a suction port.

The fluid inlet may be formed by an opening in the bottom of the inner housing.

Alternatively, the fluid inlet can be formed by a flat tubing routed to the oil sump of the oil pan, which is arranged on a side wall of the housing or inner housing and with which a connecting piece of the filter element engages. The connecting piece is arranged eccentrically on the facing end cap of the filter element and forms the connection to the filter cavity.

For the connection of the filtrate chamber of the inner housing to a suction port, the arrangement may be advantageously such that the fluid outlet of the inner housing is formed by a hollow housing part located next to the flat tubing on the side wall of the inner housing. The hollow housing forms a passage between the filtrate chamber of the inner housing encompassing the filter element and the suction port.

For the flow through the filter mat from the outside to the inside, the arrangement may be particularly advantageous in that the filter element in the oil pan is arranged in an inner housing. The inner housing is open to the oil sump, encompasses a rectangular receiving space for the filter element having long sides and short sides and has an end wall extending along one short side. The suction port is located in the end wall, with which a connecting piece is engaged. The connecting piece at one end cap of the filter element forms a passage to the filter cavity, and thus, a support part for one end of the filter element.

In this arrangement, the end cap at the other end of the filter element can form a protruding foot part. The foot part forms a support part at the bottom of the oil pan for one end of the filter element.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
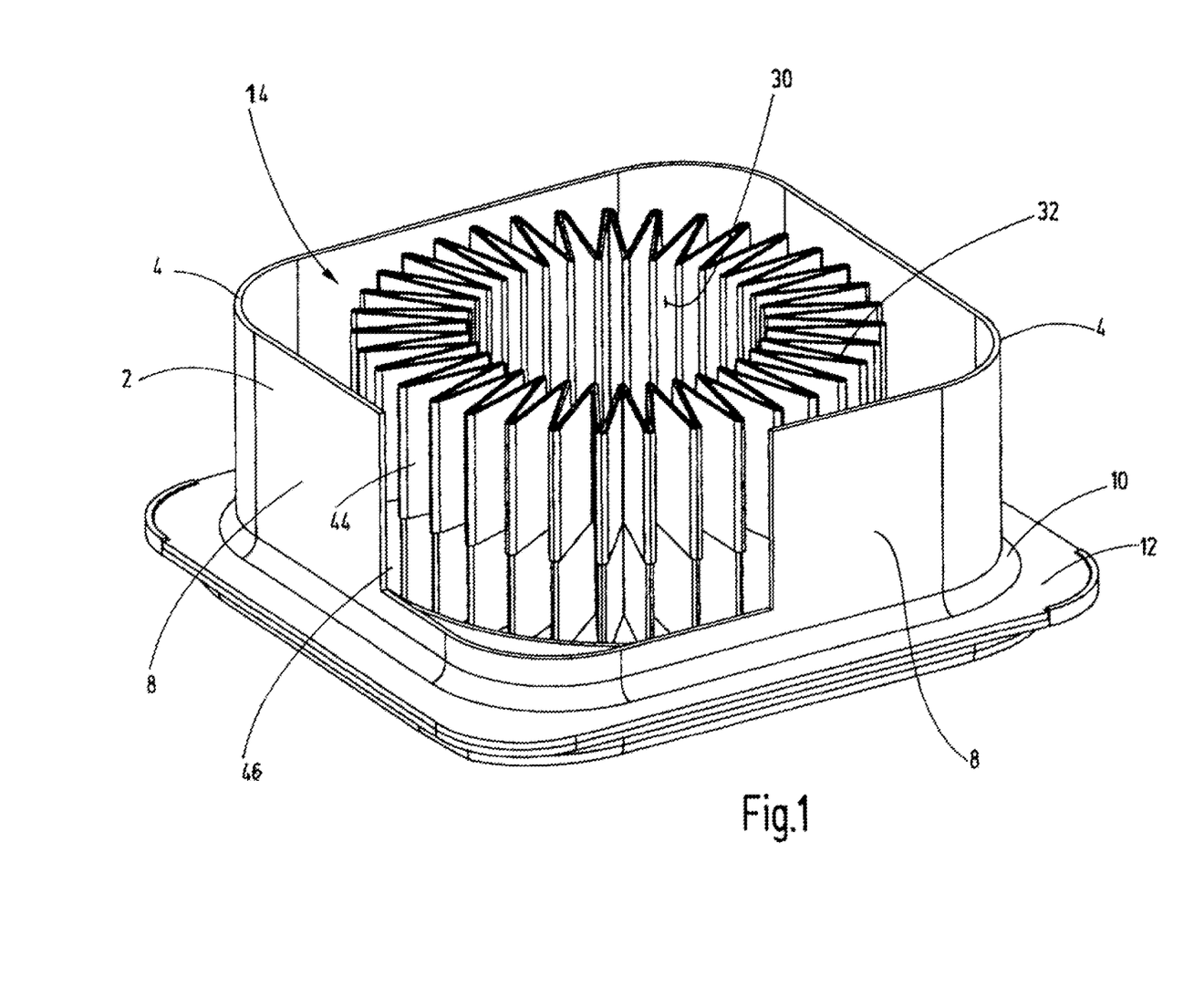
FIG. 1 is a perspective view of a filter device according to a first exemplary embodiment of the invention, wherein the housing is cut away near the upper part having a horizontal section plane and shown with the side wall of the housing cut away in parts.
Figure 2:
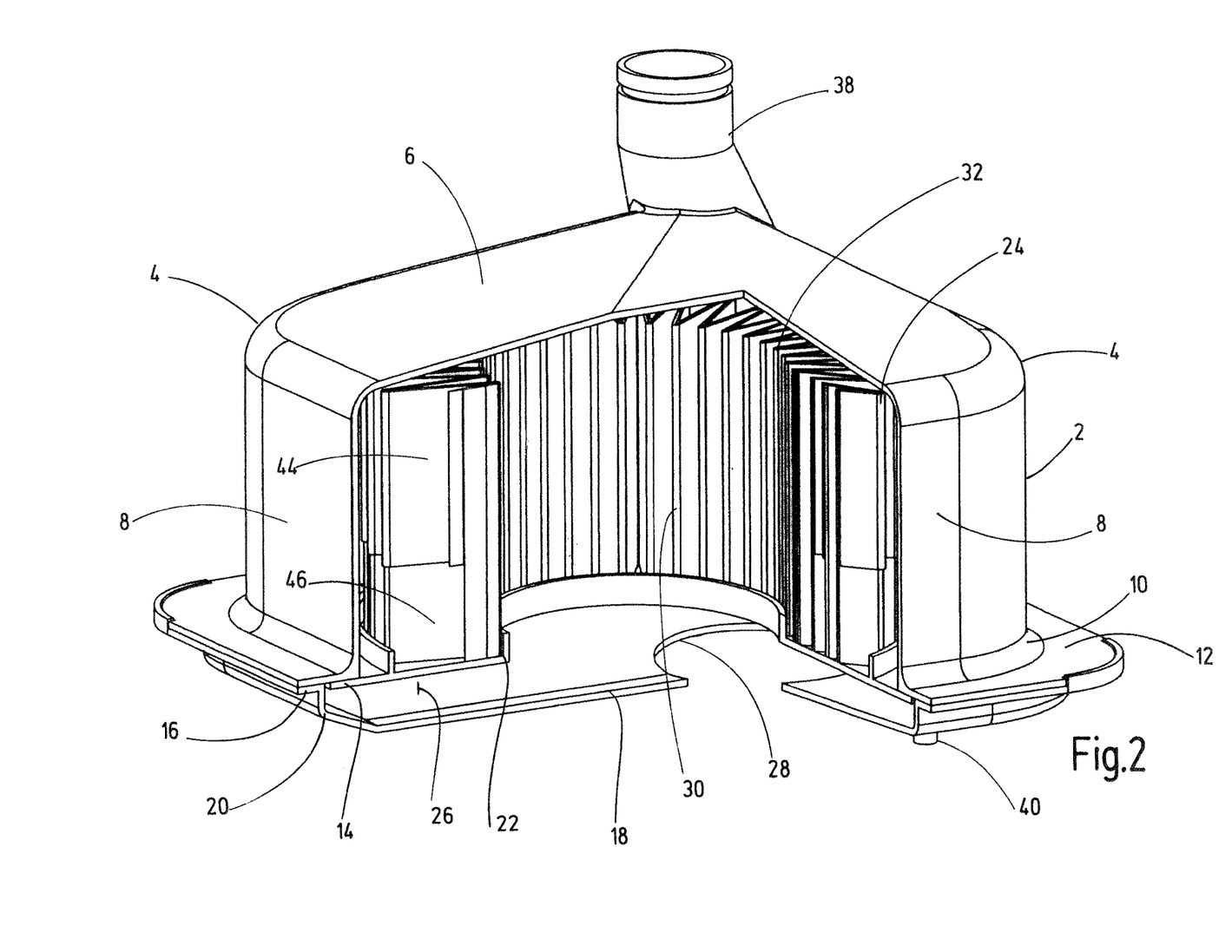
FIG. 2 is a perspective view of the filter device of the first exemplary embodiment, wherein the housing is cut away in a vertical angular section and the filter element is shown without the upper end cap.
Figure 3:
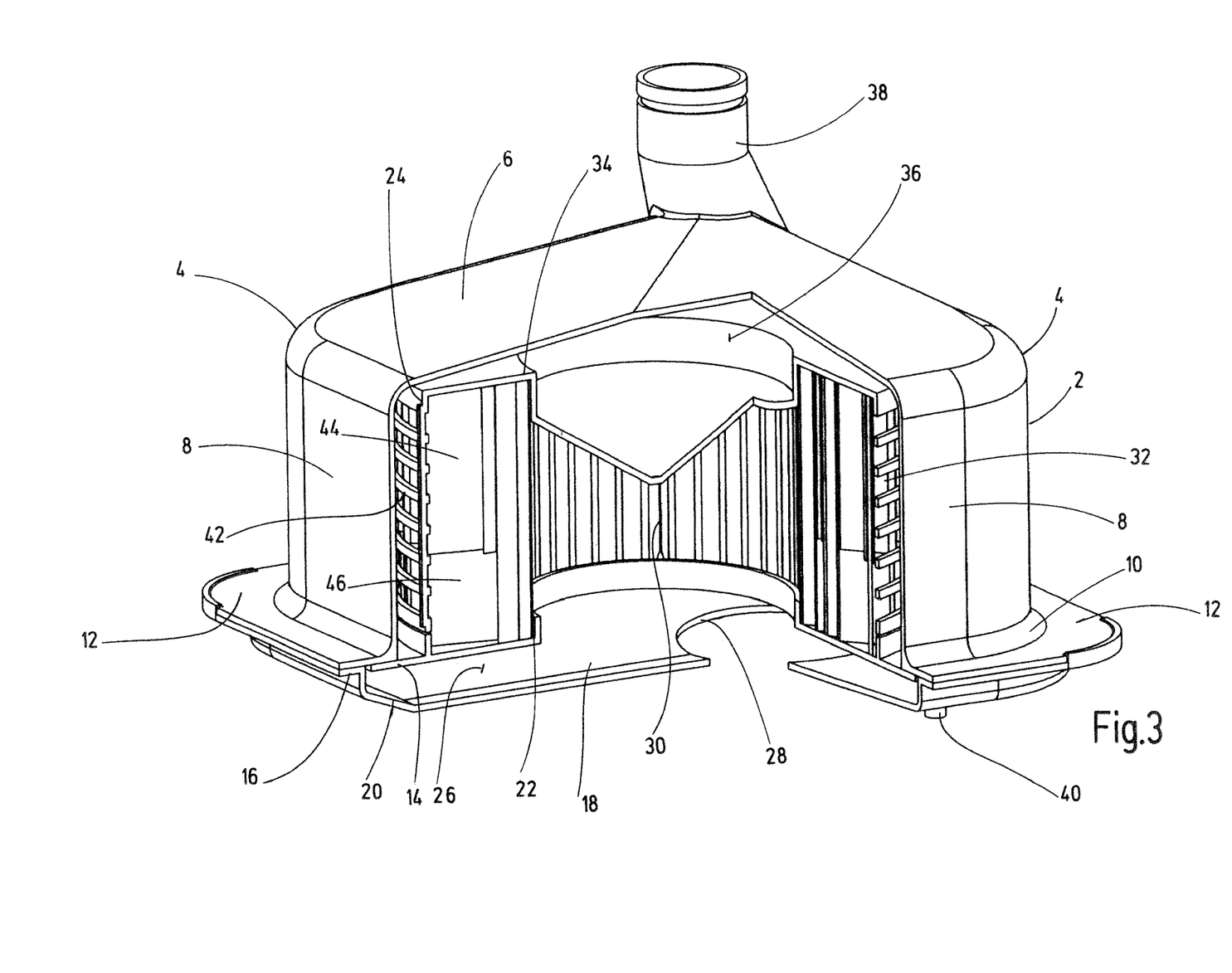
FIG. 3 is a perspective view of the filter device of the first exemplary embodiment, wherein the filter element is shown having an upper end cap and having a support tube encompassing the filter medium on the outside.

The first exemplary embodiment shown in FIGS. 1 to 3 shows a housing 2 in the form of a hood, which has a square outline having rounded corner areas 4, a flat upper cover 6 and flat side walls 8 extending vertically downwards from upper cover 6. At the lower end 10, the side walls 8 merge into a horizontal, flat end rim 12, which encompasses the entire open lower end of the hood. As FIGS. 2 and 3 show, the underside of the end rim 12 forms the contact surface for a ring body 14 and a peripheral edge 16 of a base plate 18. The peripheral edge 16 adjoins a wall part 20 of the base plate 18, which extends obliquely upwards from the plane of the base plate 18 such that the housing 2 having the end rim 12 resting on the peripheral edge 16 is raised on spacers at a distance from the main plane of the base plate 18.

The ring body 14 is part of a lower end cap 22 of the filter element 24 that is inserted into the housing 2. Due to the contact of the annular body 14 with the end rim 12, which is at a distance from the base plate 18, a free space is formed between the filter element 24 and the base plate 18. The free space forms a filter operation of the chamber holding the unfiltered medium 26, into which the unfiltered medium flows via a fluid inlet 28 formed in the base plate 18. In the case of an injection-molded housing 2 made of a plastic material such as PA6 and an end cap 22 made of plastic, the connection of the annular body 14 of the filter element 24 inserted into the housing 2 can be made by welding or gluing before the connection with the peripheral edge 16 of the base plate 18 is formed. If the housing parts are made of metallic material, these joints may also be formed by gluing or welding.

As FIGS. 2 and 3 show, the lower end cap 22 is open to the inner filter cavity 30 encompassed by the hollow cylindrical filter mat 32. The upper end cap 34 of the filter element 24 closes the filter cavity 30 at the upper end. If the suction flow direction is from the inner filter cavity 30 to the outside, the outside of the filter element 24 in housing 2 forms a filtrate chamber 36, from which the filtrate exits via a suction port 38. Suction port 38 is formed at a corner area 4 in the area of cover 6. To keep the base plate 18 at a distance from the base of the assigned oil pan (not shown), base plate 18 has spacers 40 formed on the underside of the base plate, of which only one is visible in FIGS. 2 and 3.

Each filter element 24 of the solution presented here has two end caps 22, 34 at the ends, forming an insertable unit. These end caps are not always shown in the figures for the sake of a clear illustration, or only partly in the form of showing only one end cap 22 or 34.

The spacers 40 safeguard an unobstructed flow from the oil sump to the inner filter cavity 30 during suction filter operation. The structural layers of the filter mat 32 are supported against the suction flow running from the inside to the outside by a support tube 42 shown only in FIG. 3. Support tube 42 extends on the outside of the pleated filter mat from the lower end plate 22 to the upper end plate 34. In the exemplary embodiment shown, one of the structural layers of the multilayer filter mat 32 has a surface area that differs from the other structural layers. In the example shown, the structural layer 44, starting from the upper end cap 34, extends as an outer layer over approximately half the axial length of the filter mat 32, and thus, over half the length of the other structural layers 46. As shown, the structural layer 44 is folded into the pleated composite of the filter mat 32. The structural layer 44 forms a filter area for the suction flow, the filtration grade of which differs from the filtration grade of the adjacent area of the filter mat 32. During suction filtering, parallel suction flow sections are therefore formed in which, for instance, pre-filtration and fine filtration are performed simultaneously next to each other.

Figure 4:
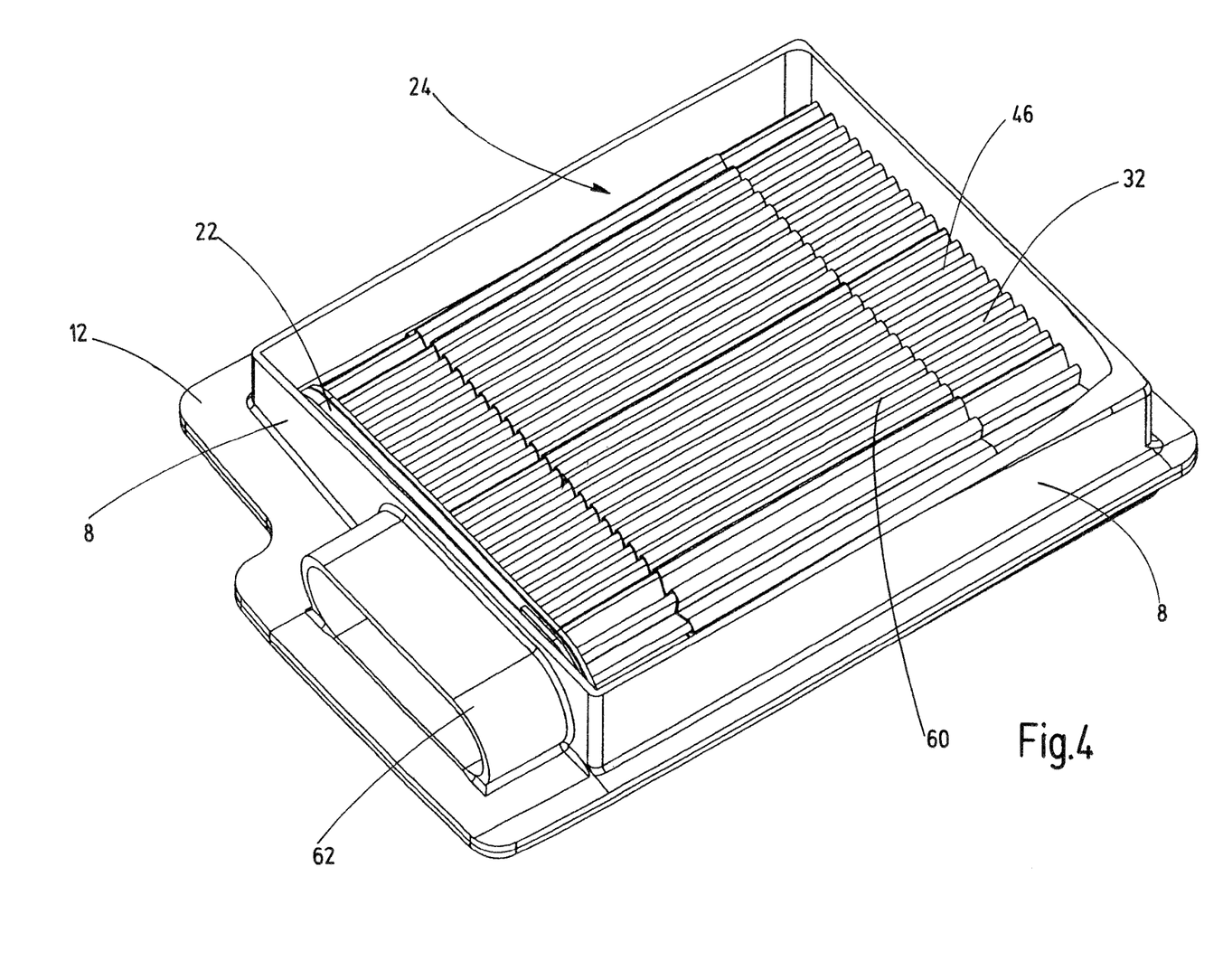
FIG. 4 is a perspective oblique view of a filter device according to a second exemplary embodiment of the invention, wherein the upper housing cover is omitted.
Figure 5:
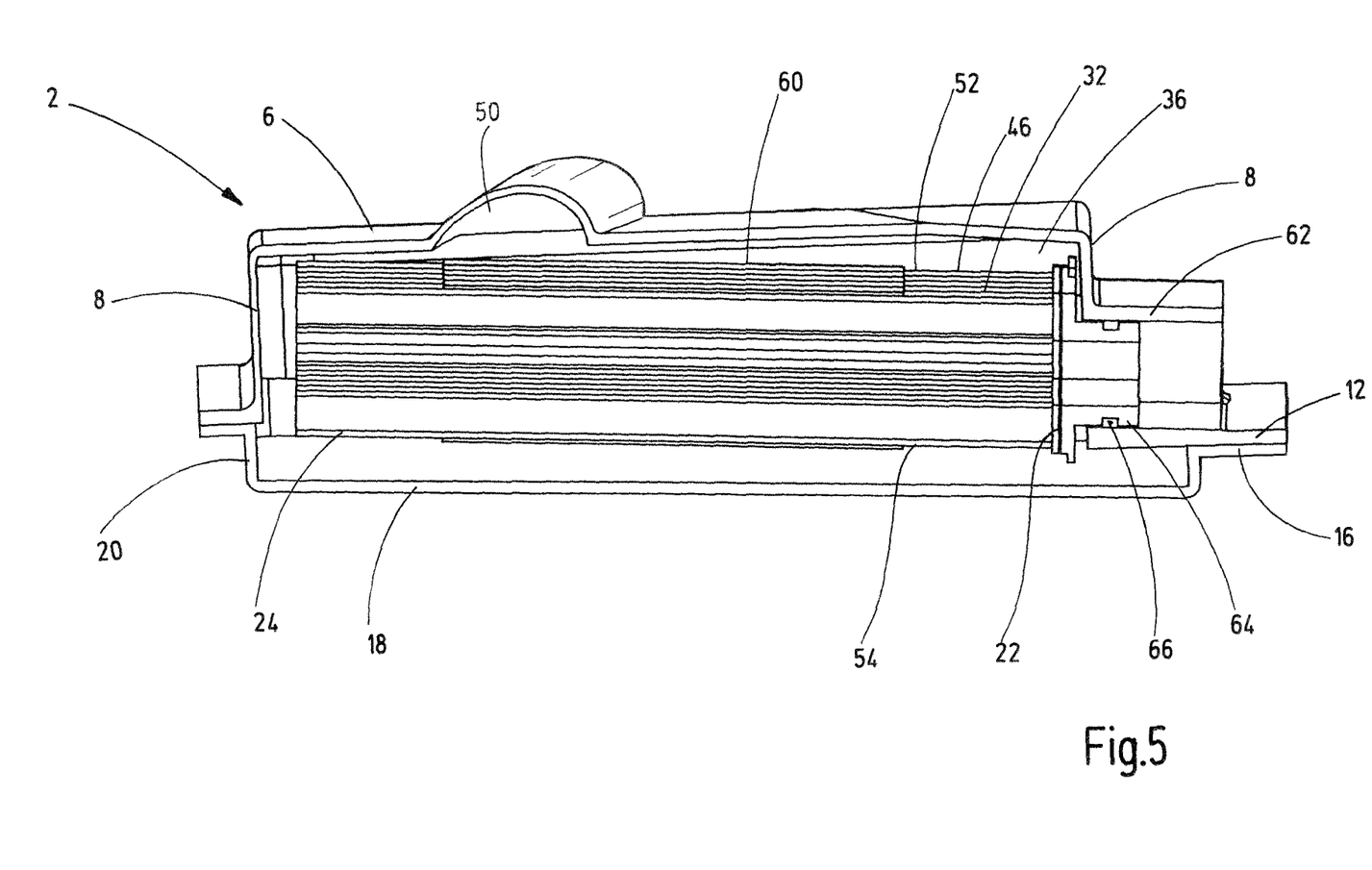
FIG. 5 is a side view in section of the filter device according to the second exemplary embodiment of FIG. 4.
Figure 6:
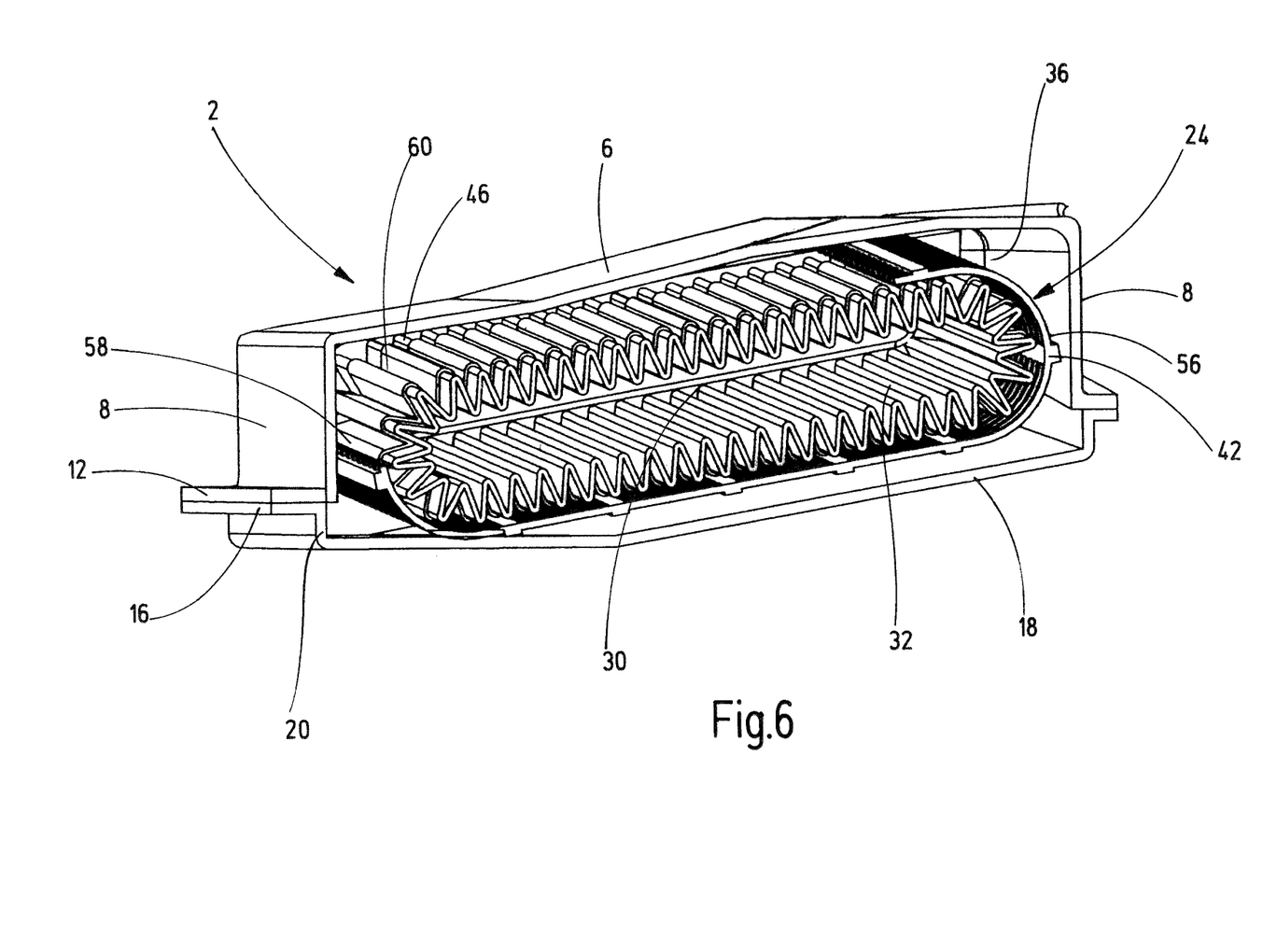
FIG. 6 is a perspective view in section of the filter device of the second exemplary embodiment of FIGS. 4 and 5, wherein an outer support tube of the filter medium is only shown in part.

FIGS. 4 to 6 show a second exemplary embodiment, in which a filter element 24 in the form of a flat filter is provided. In filter element 24, the filter mat 32 does not form a hollow circular cylinder but has a flat cross-sectional shape in relation to a section plane extending in parallel to the end caps 22. As shown in these figures, the outside of the filter mat 32 has flat, large-surface long sides 52 and 54 (cf. FIG. 5) and narrow, rounded flat sides 56 and 58 (cf. FIG. 6). As in the first exemplary embodiment, the pleated filter mat 32 has an outer structural layer 60, which has a filtration grade and surface area different from that of the other structural layers 46. In contrast to the first exemplary embodiment, this outer structural layer 60 is not connected to an end cap 22, but is arranged in the central area of the axial length of the filter mat 32 and ends equidistantly in front of the adjacent end cap 22, which distances are approximately one quarter of the total axial length of the filter mat 32.

As in the first exemplary embodiment, the housing 2 is formed by a hood, the cover 6 of which is omitted in FIG. 4 and which has a low overall height to adapt to the flat shape of the filter element 24. As in the first exemplary embodiment, the flat housing 2 is mounted on a base plate 18, which has a wall part 20 extending upwards along its circumferential area, as in the first exemplary embodiment, and on the circumferential edge 16 of which the lower end rim 12 of the housing 2 rests. In contrast to the first exemplary embodiment, no opening is provided on the base plate 18 for the inflow from the oil sump, but a flat tubing 62 is located on one side wall 8 of the housing, which, cf. FIG. 4, is arranged off-center on the side wall 8.

As FIG. 5 shows, the filter element 24 has a connecting piece 64 at its end cap 22, which is eccentric at the end cap 22 and engages with the flat tubing 62. The connecting piece 64, sealed by a sealing ring 66, establishes the connection between the oil sump and the inner filter cavity 30 of the filter element 24 for the suction filter process via the flat tubing 62 forming the fluid inlet. A fluid outlet 50, which is only shown in FIG. 5, is used to discharge the suction flow from the filtrate chamber 36 encompassing the filter element 24 and is formed on cover 6 of housing 2. As in the first exemplary embodiment, the outside of the filter mat 32 is supported against the suction flow running from the inside to the outside by means of a support tube 42 (FIG. 6).

Figure 7:
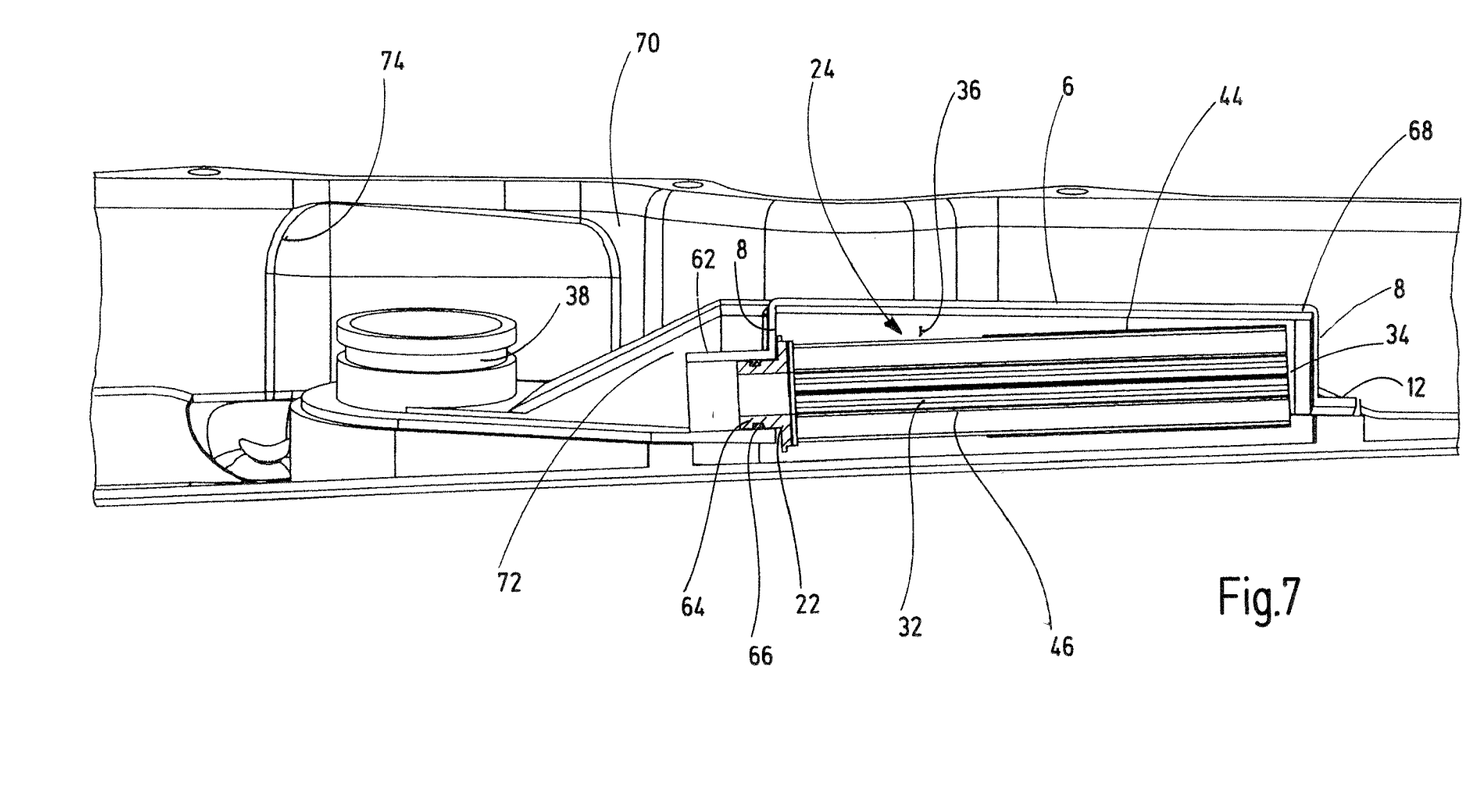
FIG. 7 is a perspective view in section of a filter device according to a third exemplary embodiment of the invention installed in an oil pan, of which only part is shown broken off.

FIG. 7 shows a third exemplary embodiment, in which the filter element 24, which is designed as a flat filter like in the second exemplary embodiment, is received in an inner housing 68 installed in a transmission oil pan 70. In the same way as in the first exemplary embodiment, the filter mat 32 of the filter element 24 has a structural layer 44, which differs from the other structural layers 46 in terms of filtration grade and surface area, which extends, like in the first exemplary embodiment, from the end cap 34 approximately along half the axial length of the filter mat 32. For the fluid inlet, the inner housing 68 has the same flat tubing 62 provided eccentrically on the side wall 8 of the housing 2 as in the second exemplary embodiment, cf. FIG. 4. As in the second exemplary embodiment, the end cap 22 of the filter element 24 also has a connecting piece 64 engaging with the flat tubing 62, which forms the connection to the inner filter cavity. For the efflux from the filtrate chamber 36 encompassing the filter mat 32, the inner housing 68 has a fluid outlet which is formed by a hollow housing part 72. Housing part 72, in addition to the flat tubing 62 which is arranged eccentrically on the side wall 8 of the inner housing 68, forms a fluid passage via which the suction flow from the filtrate chamber 36 is guided via the hollow housing part 72 to the suction port 38, which in this exemplary embodiment is located in a port chamber 74 formed in the oil sump 70.

FIGS. 8 to 11 show a fourth exemplary embodiment of a filter device according to the invention, in which the filter element 24 is arranged in an inner housing 80 to be installed in a transmission oil pan. In this exemplary embodiment, the flow is directed from the outside through the filter mat 32 extending between the end caps 22 and 34 to the inner filter cavity 30 during the filtering process. Accordingly, as shown most clearly in FIG. 9, a pipe socket 92 is formed on one end cap 22, which pipe socket establishes a connection with the inner filter cavity 30 via a passage 82 in the end cap 22. The inner filter cavity 30 forms the filtrate side.

Figure 9:
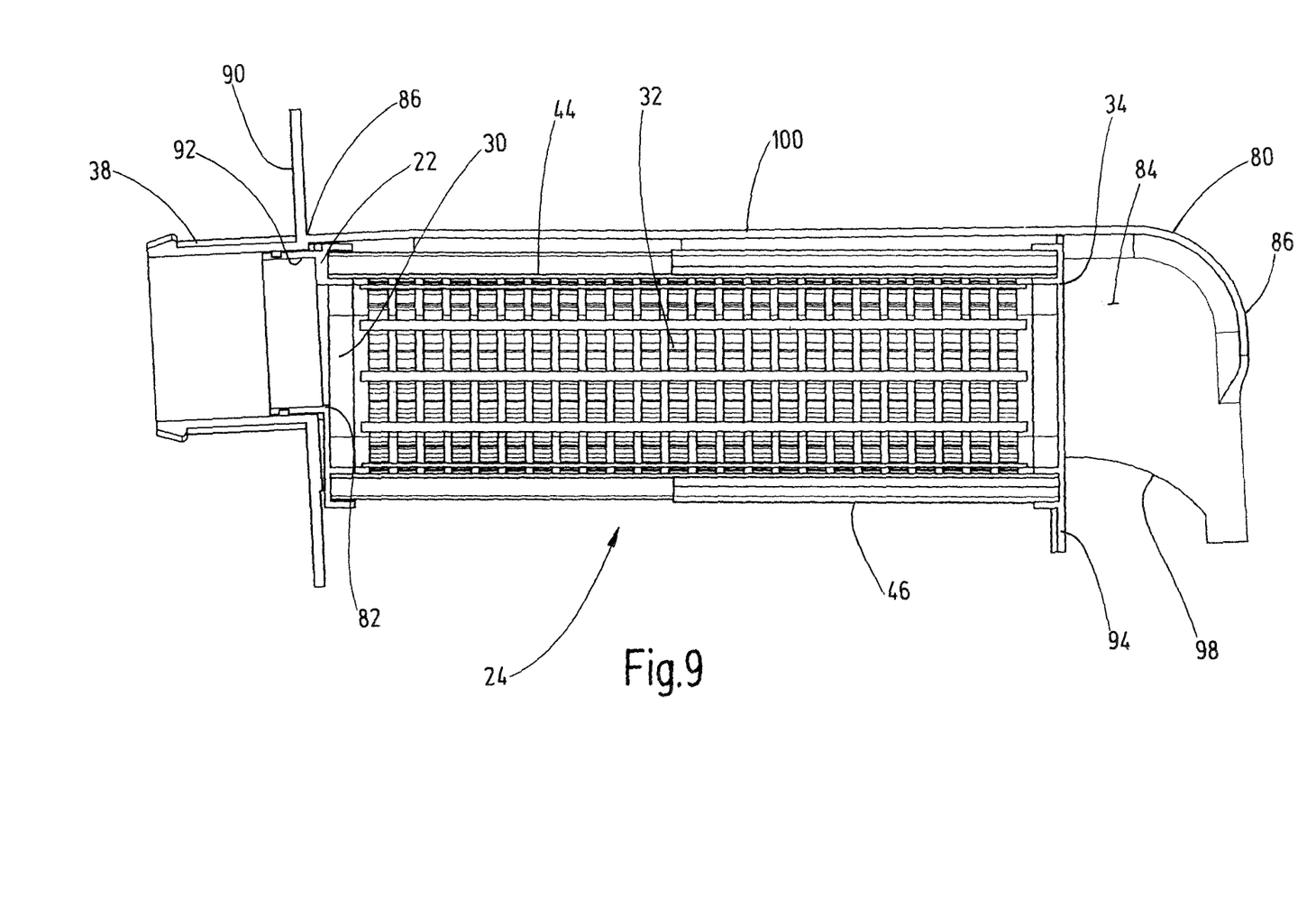
FIG. 9 is a schematically simplified side view in section of the filter device of the fourth exemplary embodiment of FIG. 8.

In the installed state of the inner housing 80, the connecting piece 92 engages with the suction port 38, which in this exemplary embodiment is located on an end wall 90 of the inner housing 80. The end wall 90 forms a support part of the inner housing 80, which can be used to immobilize the inner housing 80 in the relevant oil pan.

Figure 8:
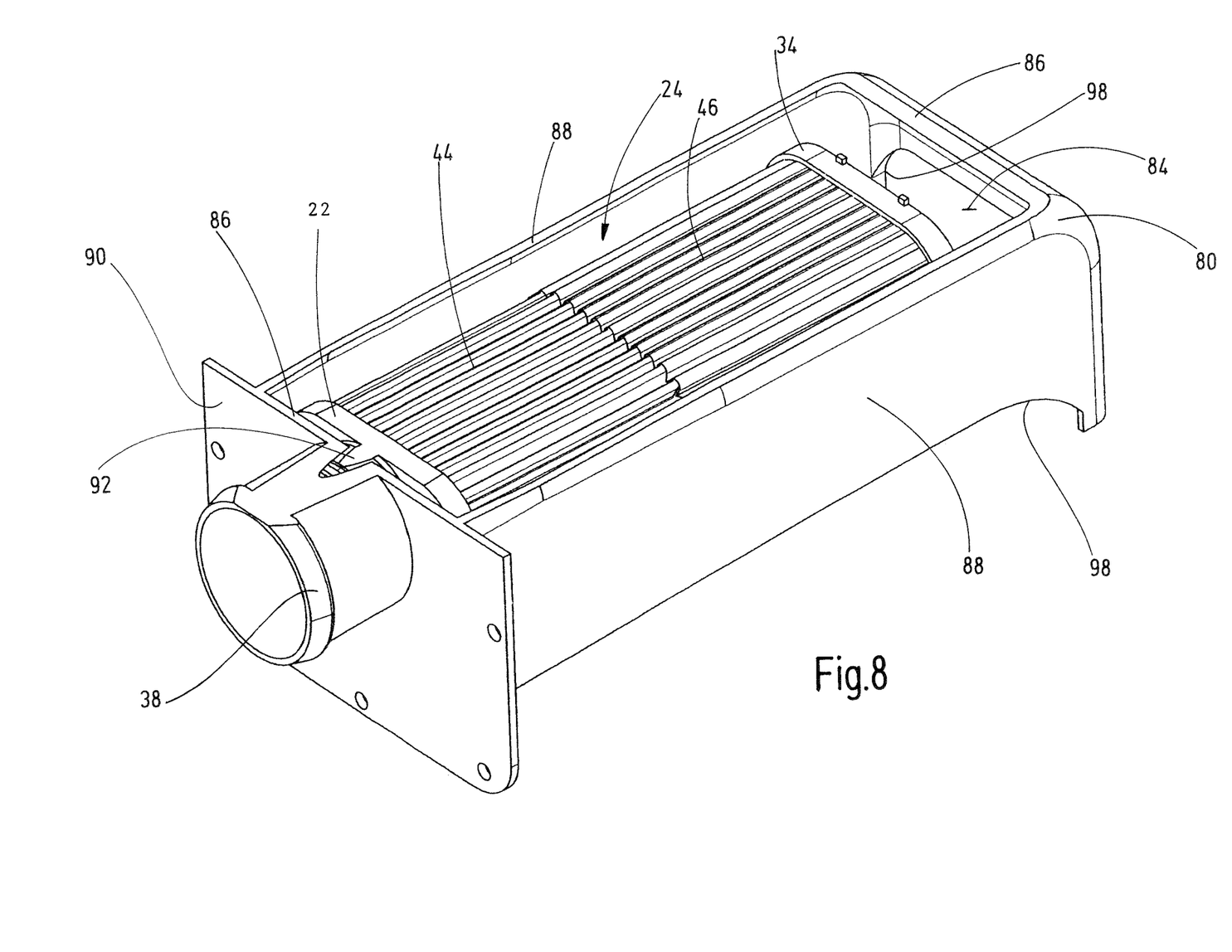
FIG. 8 is a perspective view of a filter device according to a fourth exemplary embodiment of the invention having an inner housing, which can be installed in an oil pan and which is shown without a cover part.
Figure 10:
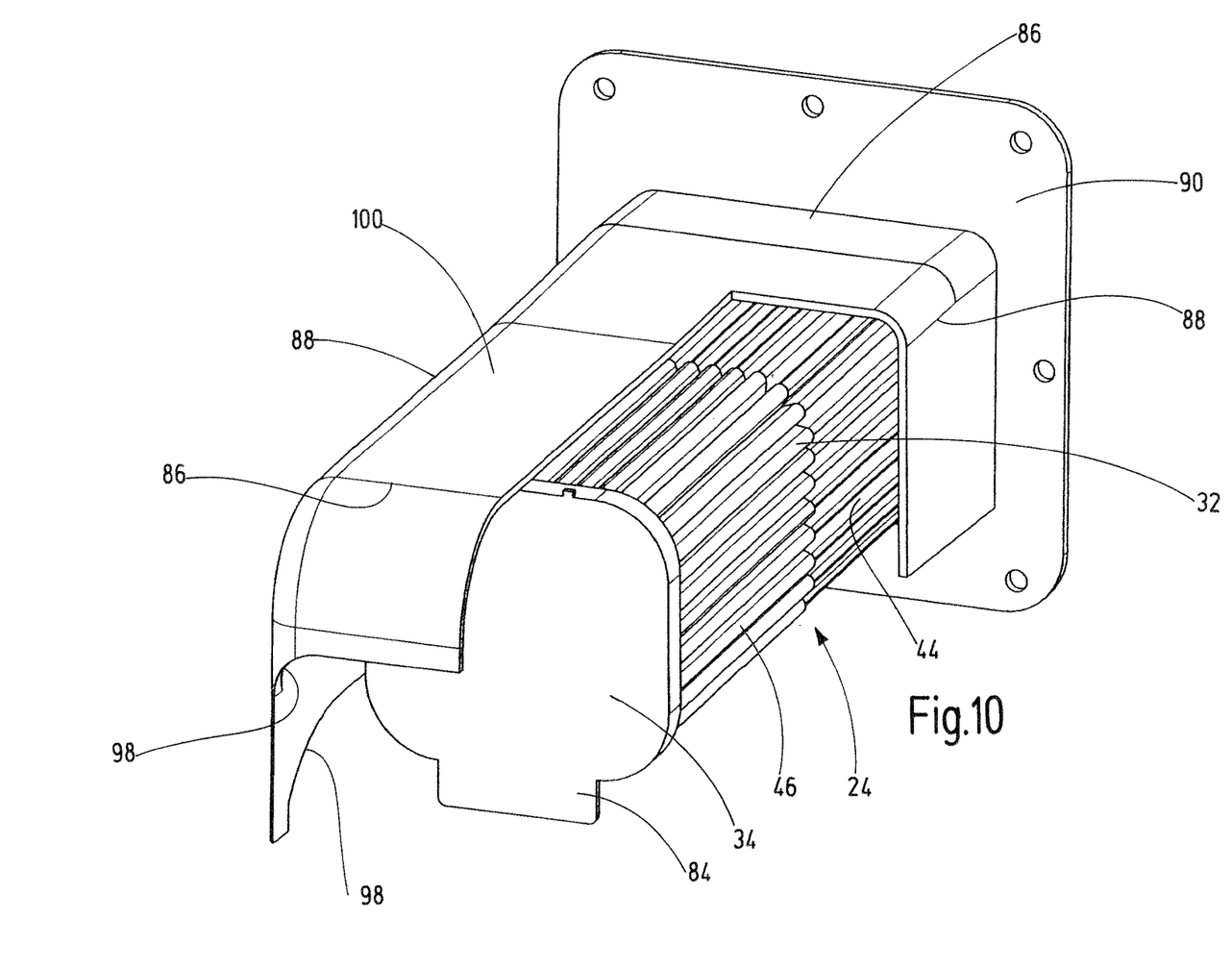
FIG. 10 is a perspective view of the filter device of the fourth exemplary embodiment of FIGS. 8 and 9, wherein parts of the inner housing are cut away.
Figure 11:
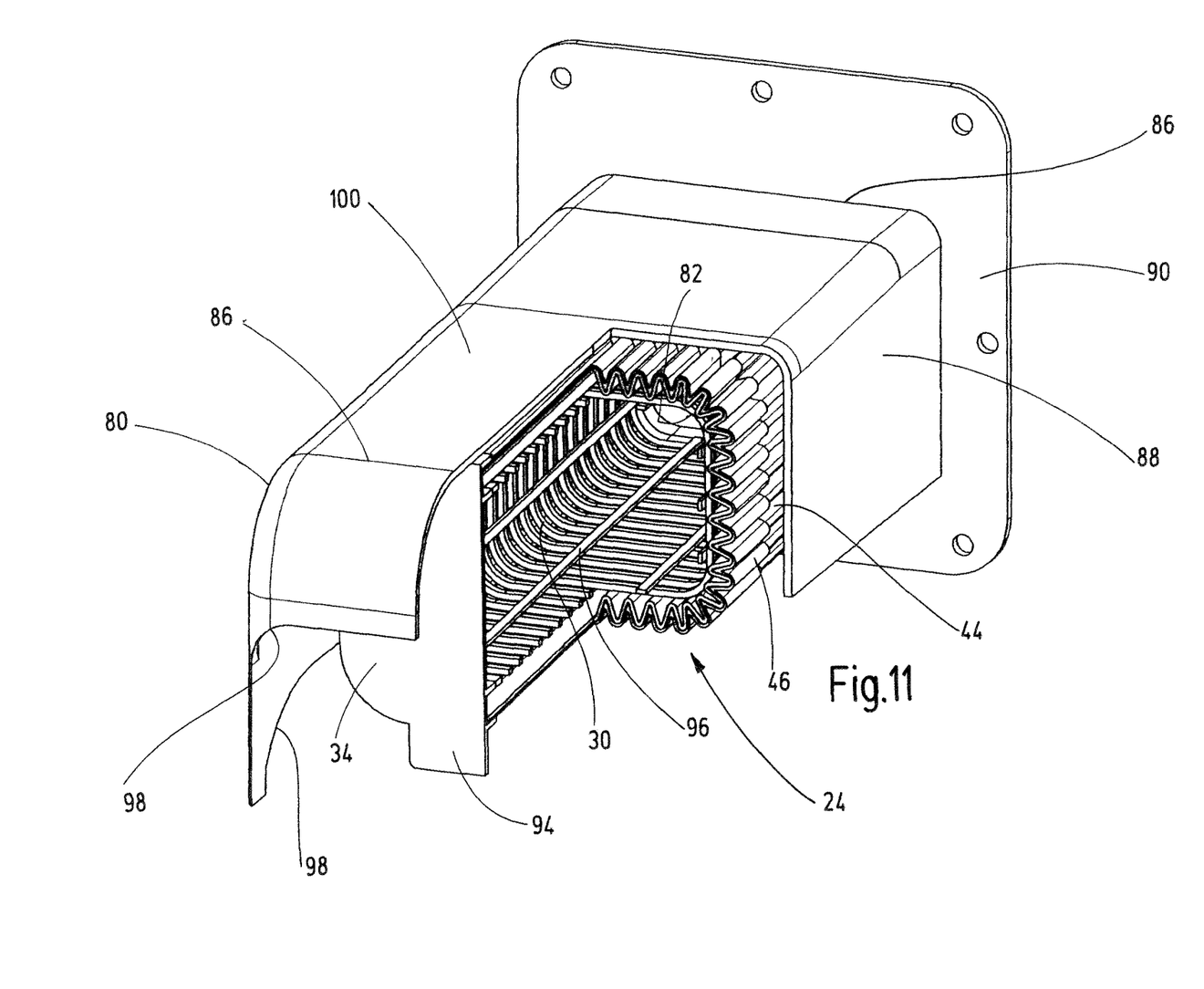
FIG. 11 is a perspective view of the filter device of FIG. 10, wherein the filter element is partially cut away.

As FIGS. 8 and 10 show, the end wall 90 has the shape of a square plate, which at a short side 86 of inner housing 80, cf. FIG. 8, delimits a receiving space 84 having a rectangular outline for the filter element 24, from which short side longitudinal sides 88 extend in vertical planes towards the opposite short side 86 of inner housing 80. The longitudinal sides 88 are not full-surface wall parts but have recesses 98, like the short side 86 opposite the end wall 90. The receiving space 84 in the inner housing 80, which is closed on the top by a flat cover part 100 omitted in FIG. 8, is open towards the oil sump.

The end cap 34 of the filter element 24, which is opposite from the end cap 22 having the passage 82, forms a flat closing plate of the hollow body formed by the filter mat 32. In contrast to the exemplary embodiment of FIG. 1, it is not a round body but, as in the exemplary embodiments of FIG. 4 to FIG. 7, has a non-circular shape. The cross-sectional shape in the exemplary embodiment in FIGS. 8 to 11 corresponds to a square having rounded corner areas. The end cap 34 has a corresponding shape, apart from a foot part 94. Foot part 94 protrudes downwards in the form of a flat strip such that, when the inner housing 80 is installed in a transmission oil pan, the foot part stands on the base of the oil pan, and thus, forms a supporting part for one end of the filter element 24. The other end of inner housing 80 is fixed to the end wall 90 via the connecting piece 92 located at the end cap 22, which in turn forms a supporting part of the inner housing 80.

A prefilter formed of the individual superimposed structural layers can be designed in terms of fluid permeability such that it permits high fluid quantities to pass through at an acceptable dirt holding capacity, which is improved by a higher filtration grade of the main filter, formed by a further structural layer. The result is that the fluid permeability of the prefilter is reduced to a minimum during a cold start of the engine when the transmission oil to be filtered is still cold and correspondingly highly viscous, the flow resistance of the prefilter is low. The main filter in conjunction with parts of the prefilter then provides the desired dirt pick-up capacity.

Several structural layers having different filter properties and different areas of the superimposed layers can be combined, resulting in a variety of design options for the individual filter element. For instance, very high separation rates (beta values) at different differential pressures of the fluid to be filtered or the filtration of certain fluid components of a fluid to be filtered, which can only be detected from a certain structural position, can be implemented. The filter element can be individually adapted to the individual transmission situation functions by replacing and using structural layers in a self-explanatory manner when creating a new filter element in a kind of modular system, which is without parallel in the prior art. It is particularly advantageous to select the respective overlap in such a way that the edge of a structural layer placed on another structural layer is equidistant to both longitudinal sides of the other structural layer, which improves the fluid flow behavior of the filter element. It is irrelevant whether the fine filter layer forming the main filter is adjacent to one of the end caps or at a distance from both end caps.

While various embodiments have been chosen to illustrate the invention, it will be un-derstood by those skilled in the art that various changes and modifications can be made therein without departing from the scope of the invention as defined in the claims.

The invention claimed is:

1. A filter device for transmission oil, the filter device comprising:
   a housing capable of being inserted in a transmission oil pan, the housing having a negative-pressure outlet port connectable to a negative-pressure conveyor; and
   a filter element accommodated in the housing separating an unfiltrate chamber from a filtrate chamber inside the housing, the filtrate chamber being connected in fluid communication with the outlet port, the filter element including a filter medium having a first structural layer with a predeterminable first areal extension and a predeterminable first filter grade and having a second structural layer with a second areal extension and a predeterminable second filter grade higher than the first filter grade, the first areal extension being different from the second areal extension, the first and second structural layers encompassing an inner filter cavity and being pleated with each of the first and second structural layers having a same type of pleats, the first and second structural layers extending in axial alignment between first and second end caps, the second structural layer being downstream of the first structural layer in a fluid flow direction through the filter medium, the filter element being in a form of a flat filter with a flat cross-sectional shape having larger-area planar first and second long sides and narrower and rounded first and second short sides, the long sides being in sectional planes extending parallel to the first and second end caps, the first long side facing a bottom of the housing, the second long side facing a planar top part of a cover of the housing.

2. A filter device according to claim 1 wherein each of the first and second structural layers comprise a single-layer or multi-layers.

3. A filter device according to claim 1 wherein
   the inner filter cavity is connected in direct fluid communication to an input port of the housing and forms the unfiltrate chamber such that the fluid flow direction is from an inside to an outside of the filter medium; and
   a supporting structure encompasses an outside of the filter medium.

4. A filter device according to claim 1 wherein
   the inner filter cavity is connected in direct fluid communication to the outlet port of the housing and forms the filtrate chamber such that the fluid flow direction is from an outside to an inside of the filter medium; and
   a supporting structure is on an inside of the second structural layer.

5. A filter device according to claim 1 wherein
   the housing and the filter element are in the transmission oil pan; and
   the housing comprises an inlet in direct fluid communication with the inner filter cavity with the filtrate chamber encompassing the filter element and being in direct fluid communication with the outlet port.

6. A filter device according to claim 1 wherein
   the housing comprises an inlet port that is an opening in a bottom of the housing.

7. A filter device according to claim 1 wherein
   the housing comprises an inlet port being connectable to an oil sump in the transmission oil pan and having a flat tubing on a side wall of the housing; and
   the filter element comprises a connecting piece being arranged eccentrically on a facing end of the first end cap and forming a fluid communication connection to the inner filter cavity.

8. A filter device according to claim 7 wherein
   the outlet port comprises a housing part located next to the flat tubing at the side wall of the housing, the housing part forming a passage between the filtrate chamber encompassing the filter element and the outlet port.

9. A filter device according to claim 4 wherein
   the housing and the filter element are located in the transmission oil pan with the housing opening towards an oil sump in the transmission oil pan and encompassing a rectangular receiving space for the filter element, the housing have longitudinal sides and short sides and having an end wall extending along one of the short sides, the outlet port being located in the end wall, the first end cap forming a passage to the inner filter cavity and support one end of the filter element.

10. A filter device according to claim 9 wherein
    the second end cap comprises a protruding foot part forming a support on end of the filter element adjacent thereto at a bottom of the transmission oil pan.

11. A filter device according to claim 1 wherein
    the negative-pressure conveyor comprises a suction oil pump.

12. A filter device for transmission oil, the filter device comprising:
    a housing capable of being inserted in a transmission oil pan, the housing having a negative-pressure outlet port connectable to a negative-pressure conveyor;
    a filter element accommodated in the housing separating an unfiltrate chamber from a filtrate chamber inside the housing, the filtrate chamber being connected in fluid communication with the outlet port, the filter element including a filter medium having a first structural layer with a predeterminable first areal extension and a predeterminable first filter grade and having a second structural layer with a second areal extension and a predeterminable second filter grade higher than the first filter grade, the first areal extension being different from the second areal extension, the first and second structural layers encompassing an inner filter cavity and being pleated with each of the first and second structural layers having a same type of pleats, the first and second structural layers extending in axial alignment between first and second end caps, the second structural layer being downstream of the first structural layer in a fluid flow direction through the filter medium; and a planar upper cover and side walls extending vertically downwardly from the planar upper cover and merging into a horizontal flat end rim of the housing, the end rim being connected to a ring body of the first end cap and to a peripheral edge of a base plate of the housing, the base plate extending upwardly from a planar bottom part of the base plate with the ring body of the first end cap being spaced at a distance from the planar bottom part of the base plate.

13. A filter device for transmission oil, the filter device comprising:

a housing inserted in a transmission oil pan, the housing having a negative-pressure outlet port connectable to a negative-pressure conveyor;

a filter element accommodated in the housing separating an unfiltrate chamber from a filtrate chamber inside the housing, the filtrate chamber being connected in fluid communication with the outlet port, the filter element including a filter medium having a first structural layer with a predeterminable first areal extension and a predeterminable first filter grade and having a second structural layer with a second areal extension and a predeterminable second filter grade higher than the first filter grade, the first areal extension being different from the second areal extension, the first and second structural layers encompassing an inner filter cavity and being pleated with each of the first and second structural layers having a same type of pleats, the first and second structural layers extending in axial alignment between first and second end caps, the second structural layer being downstream of the first structural layer in a fluid flow direction through the filter medium, the inner filter cavity being in direct fluid communication with the outlet port of the housing and forming the filtrate chamber such that the fluid flow direction through the filter medium is from an outside to an inside of the filter element;

an oil sump in the transmission oil pan, the housing having an opening that opens towards the oil sump;

a rectangular receiving space in the housing receiving the filter element, the housing having longitudinal sides and short sides and having an end wall extending along one of the short sides, the outlet port being located in the end wall; and a connecting piece at an end of the first end cap forming a passage between the inner filter cavity and the outlet port and forming a support for one end of the filter element.

* * * * *